(12) United States Patent
Bryant et al.

(10) Patent No.: US 9,963,269 B2
(45) Date of Patent: May 8, 2018

(54) PACKAGE FOR MULTI-INSTANCE PHOTOSENSITIVE AUTHENTICATION

(71) Applicant: Owens-Brockway Glass Container Inc., Perrysburg, OH (US)

(72) Inventors: Jessica R. Bryant, Toledo, OH (US); Roger P. Smith, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 287 days.

(21) Appl. No.: 14/718,744

(22) Filed: May 21, 2015

(65) Prior Publication Data

US 2016/0340082 A1 Nov. 24, 2016

(51) Int. Cl.
| | |
|---|---|
| *B65D 25/20* | (2006.01) |
| *G06F 21/30* | (2013.01) |
| *B65D 23/00* | (2006.01) |
| *B65D 25/00* | (2006.01) |

(52) U.S. Cl.
CPC ........... *B65D 25/205* (2013.01); *B65D 23/00* (2013.01); *B65D 25/00* (2013.01); *G06F 21/30* (2013.01); *B65D 2101/00* (2013.01); *B65D 2203/12* (2013.01)

(58) Field of Classification Search
CPC ...... B65D 25/205; B65D 23/00; B65D 25/00; B65D 2203/12; B65D 2101/00; B65D 23/14; G06F 21/30
USPC .............................. 726/18; 713/168; 705/318
See application file for complete search history.

(56) References Cited

U.S. PATENT DOCUMENTS

| | | | |
|---|---|---|---|
| 6,378,906 B1 | 4/2002 | Pennaz | |
| 6,442,276 B1 | 8/2002 | Doljack | |
| 6,726,013 B2 | 4/2004 | Pennaz | |
| 7,044,614 B2* | 5/2006 | Levy | G06F 1/1616 |
| | | | 250/483.1 |
| 7,283,630 B1 | 10/2007 | Doljack | |
| 7,357,967 B2 | 4/2008 | Osika et al. | |
| 7,436,499 B2 | 10/2008 | Hiltner et al. | |
| 8,212,226 B2 | 7/2012 | Chisholm | |
| 2004/0000787 A1* | 1/2004 | Vig | B41M 3/14 |
| | | | 283/113 |
| 2004/0121268 A1* | 6/2004 | Conroy | G11B 7/24094 |
| | | | 430/321 |

(Continued)

FOREIGN PATENT DOCUMENTS

| | | |
|---|---|---|
| CN | 202736396 U | 2/2013 |
| DE | 102006019227 A1 | 12/2007 |
| WO | WO 2011/135250 | 11/2011 |

OTHER PUBLICATIONS

PCT International Search Report and Written Opinion, Int. Serial No. PCT/US2016/031571, Int. Filing Date: May 10, 2016, Applicant: Owens-Brockway Glass Container Inc., dated Jul. 21, 2016.

*Primary Examiner* — Shanto M Abedin (57) ABSTRACT

A package for multi-instance photosensitive authentication includes a container, and a photochromic material non-removably carried by the container and irreversibly changeable upon exposure to ultraviolet (UV) light. The package also includes a UV protector carried over the photochromic material to protect the photochromic material from premature exposure to the UV light, and having multiple portions that are removable to expose multiple portions of the photochromic material to UV light and are irreplaceable once removed.

23 Claims, 4 Drawing Sheets

(56) References Cited

U.S. PATENT DOCUMENTS

| | | |
|---|---|---|
| 2005/0024955 A1 | 2/2005 | Brosow |
| 2005/0071044 A1 | 3/2005 | Yonge et al. |
| 2005/0116465 A1 | 6/2005 | Muscat |
| 2009/0166427 A1* | 7/2009 | Chambers .......... G06K 7/10792 235/468 |
| 2009/0284732 A1* | 11/2009 | Vitale .................... B65D 23/16 356/51 |
| 2011/0228518 A1 | 9/2011 | Vagnby |
| 2012/0254052 A1 | 10/2012 | Gao et al. |
| 2012/0291894 A1 | 11/2012 | Higgins |
| 2012/0310848 A1 | 12/2012 | Gao et al. |
| 2013/0075676 A1* | 3/2013 | Purdy .................... B82Y 20/00 252/586 |
| 2013/0134056 A1 | 5/2013 | Buynak et al. |
| 2014/0008441 A1 | 1/2014 | Huynh |
| 2014/0055264 A1 | 2/2014 | Valiulis et al. |
| 2014/0116911 A1 | 5/2014 | Bryant |
| 2014/0138274 A1* | 5/2014 | Smith .................... B65D 49/00 206/459.1 |
| 2014/0197241 A1 | 7/2014 | Lawandy |
| 2014/0210201 A1 | 7/2014 | Owen et al. |
| 2014/0262897 A1* | 9/2014 | Smith .................... B65D 23/14 206/459.1 |
| 2014/0263152 A1* | 9/2014 | Smith .................... B65D 1/023 215/47 |
| 2014/0342464 A1 | 11/2014 | Cooper |
| 2015/0235233 A1* | 8/2015 | Dangmann ........ G06Q 30/0185 705/318 |

\* cited by examiner

PACKAGE FOR MULTI-INSTANCE PHOTOSENSITIVE AUTHENTICATION

This patent application discloses innovations to packages and, more particularly, to packaging containers having anti-counterfeit features.

BACKGROUND

Packaging containers may be provided with anti-counterfeit authentication features. U.S. patent publications that illustrate containers of this type include 2014/0116911 and 2014/0138274. Packaging containers are known to include single-instance authentication.

BRIEF SUMMARY OF THE DISCLOSURE

The present disclosure embodies a number of aspects that can be implemented separately from or in combination with each other.

A package for multi-instance photosensitive authentication in accordance with one aspect of the disclosure includes a container, and a photochromic material non-removably carried by the container and irreversibly changeable upon exposure to ultraviolet (UV) light. The package also includes a UV protector carried over the photochromic material to protect the photochromic material from premature exposure to the UV light, and having multiple portions that are removable to expose multiple portions of the photochromic material to UV light and are irreplaceable once removed.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

A general object of the present disclosure, in accordance with one aspect thereof, is to provide an anti-counterfeit package capable of being authenticated multiple times, for example, by multiple different purchasers or users of the package.

Figures 1, 1A, 2:
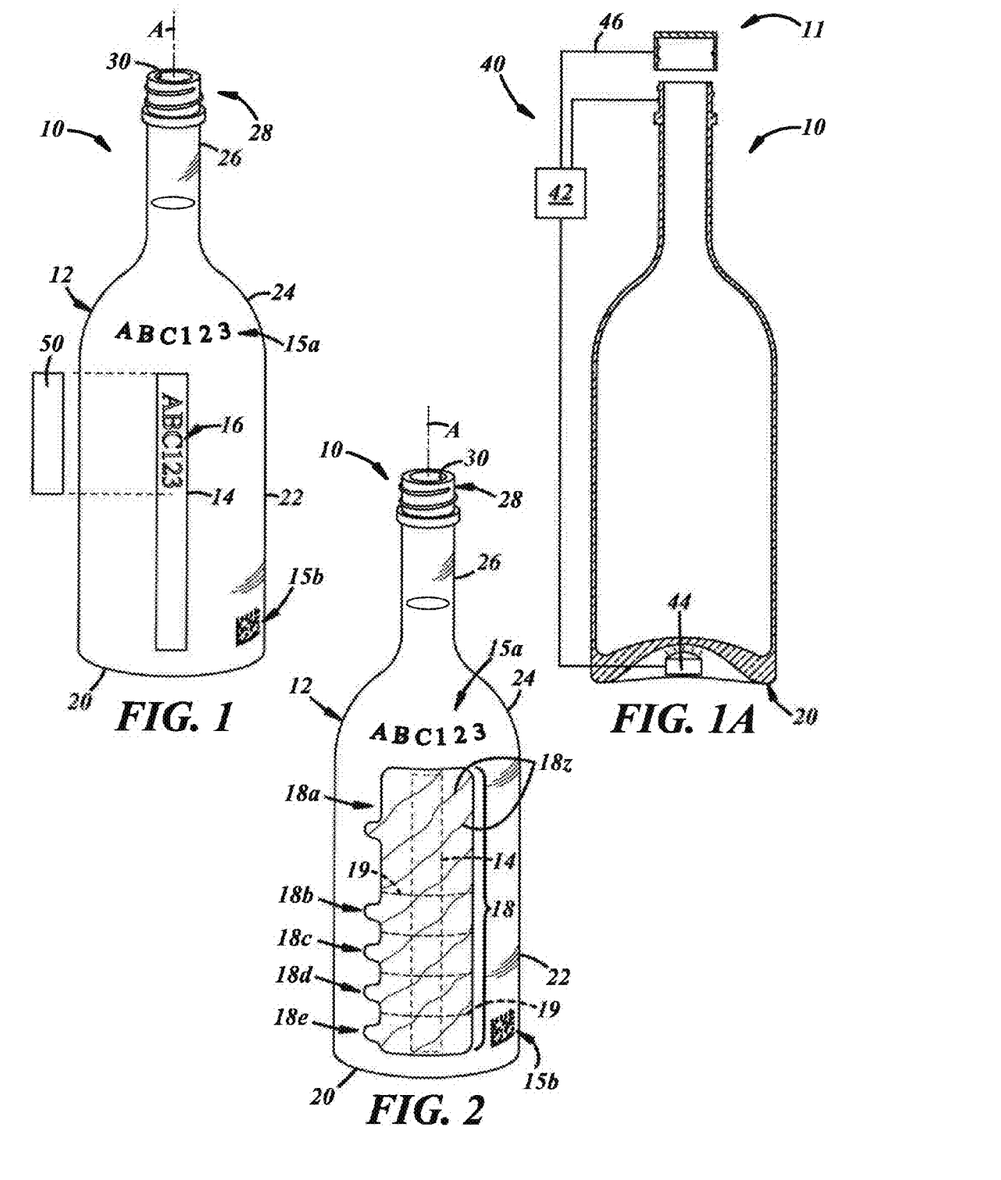
FIG. 1 is a perspective view of a package in accordance with an illustrative embodiment of the present disclosure and illustrating a container, a photochromic material carried by the container, an identification code non-removably carried by the photochromic material, a user readable identification code, and a machine readable identification code.
FIG. 1A is a schematic cross-sectional view of the package of FIG. 1, illustrating a lighting circuit 40.
FIG. 2 is a perspective view of the package of FIG. 1, illustrating an ultraviolet light protector carried by the container over the photochromic material.

With reference now to the drawing figures, FIG. 1 illustrates a package 10 for multi-instance photosensitive authentication and including a glass container 12 to contain a beverage or the like, and photochromic material 14 that is non-removably carried by the container 12 and that changes appearance upon exposure to ultraviolet (UV) light. The package 10 also may include an identification (ID) code 16 permanently or non-removably carried by the photochromic material 14.

Figures 3, 4, 5:
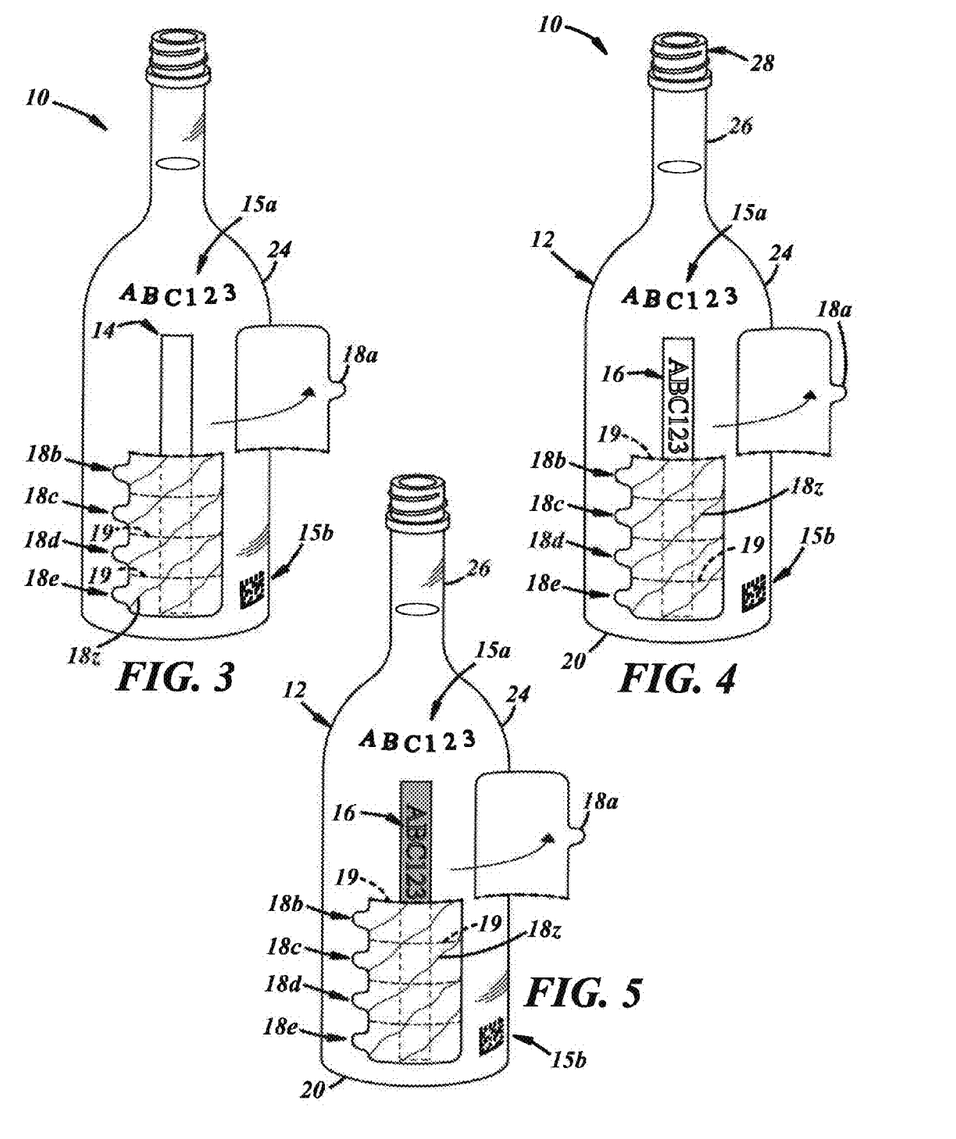
FIG. 3 is a perspective view of the package of FIG. 1, illustrating a first portion of the protector initially moved or removed from the container to reveal a first portion the photochromic material.
FIG. 4 is a perspective view of the package of FIG. 1, illustrating darkening of the first portion of the photochromic material.
FIG. 5 is a perspective view of the package of FIG. 1, illustrating further darkening of the first portion of the photochromic material.

With reference to FIG. 2, the package 10 also includes a UV protector 18 carried over the photochromic material 14 to protect the photochromic material 14 from premature exposure to the UV light. As in the illustrated embodiment, the UV protector 18 may cover the entire outer portion of the photochromic material 14. But in other embodiments, the UV protector 18 may cover less than the entirety of the outer portion of the photochromic material 14. With reference to FIGS. 2 and 3, the protector 18 includes multiple portions 18a-e that are removable to expose corresponding multiple portions of the photochromic material 14 to UV light and are irreplaceable once removed to facilitate multiple instances of authentication of the package 10. In this embodiment, the UV protector 18 includes a linear array of portions.

The container 12 may be filled with a beverage, closed with a closure (11; FIG. 1A) and/or otherwise sealed, and distributed to a retail point of sale. Upon purchase of the beverage-filled package at the retail point of sale, a purchaser may verify authenticity of the package 10 by removing a portion of the UV protector 18 to expose a portion of the photochromic material 14 to UV light. In one example, such exposure may reveal a textual representation of authenticity, for instance, the text "AUTHENTIC", "ORIGINAL", "FIRST USE", "SECOND USE", or the like, or any other graphical representation suitable to indicate authenticity. In another example, such exposure may reveal the ID code 16 in the photochromic material 14, thereby allowing the purchaser to verify authenticity, for example, by cross-referencing the ID code 16 with a database of authentic codes, or in any other use of the ID code 16 suitable to verify authenticity.

As used herein, the terminology "non-removably carried" includes a manner in which the photochromic material 14 and/or the code 16 is, by design-intent, not intended to be removed from the container 12 without damaging the container 12, the material 14, and/or the code 16 or otherwise visibly compromising the structural and/or functional integrity of same. Additionally, as used herein, the phrase "carried by the container" includes carried on an external surface of the container, carried in a wall of the container, coupled to the container, and the like. As used herein, the term "photosensitive" includes, by design intent, the properties of visible darkening or latent image forming after exposure to light. Also, as used herein, the term "visible" includes visible to the human eye at arm's length in indirect sunlight.

The container 12 may be a bottle, jar, jug, other food or beverage container, or any other suitable container, and may be composed of plastic, metal, or any other suitable material, but is preferably composed of glass. The container 12 may be of one-piece integrally formed construction, preferably glass or plastic construction. (The term "integrally formed construction" does not exclude one-piece integrally molded layered glass constructions of the type disclosed for example in U.S. Pat. No. 4,740,401, or one-piece glass bottles to which other structure is added after the bottle-forming operation.) In one embodiment, the container 12 may be fabricated in press-and-blow or blow-and-blow glass container manufacturing operations.

With respect to FIG. 1, the container 12 may include a longitudinal axis A, a base 20 at one axial end of the container 12 that is closed, a body 22 extending in an axial direction from the closed base 20, a shoulder 24 extending axially and radially from the body 22, and a neck 26 extending axially from the shoulder 24 and including a finish 28 and an open mouth 30 at another end of the container 12 opposite of the base 20. As used herein, the term "axial" includes oriented generally along the longitudinal axis A and may include but is not limited to a direction that is strictly parallel to the axis A. The term "radial" includes oriented generally along a radial line with respect to the longitudinal axis A of the container 12 and may include but is not limited to a direction that is strictly perpendicular to the container axis A. The body 22 may be of any suitable shape in cross-section transverse to the axis A as long as the body 22 is circumferentially closed. For example, the body 22 may be of cylindrical transverse cross-sectional shape that is circumferentially closed. In other embodiments, the body 22 may be generally oval, square, rectangular, triangular, or of any other suitable transverse cross-sectional shape. As used herein, the term circumferentially applies not only to circular transverse cross-sectional shapes but also applies to any closed transverse cross-sectional shape.

The photochromic material 14 is responsive to ultraviolet (UV) light so as to irreversibly change upon exposure thereto. For example, exposure of the photochromic material 14 to UV light may irreversibly activate the photochromic material 14 so as to establish a latent image therein or latent darkening thereof that, for example, is not visible until the material 14 is later exposed to visible light. The photochromic material 14 may include a metal halide material, which may include silver, copper, and/or cadmium with chlorine, bromine, and/or iodine halides. The photochromic material 14 may include any suitable material selected from the group(s) consisting of the aforementioned materials, or from any other suitable photochromic material(s). Photochromic materials, in and of themselves, and their application to glass, are well known to those of ordinary skill in the art, as illustrated by U.S. Pat. No. 3,325,299. But the particular use of photochromic material as disclosed herein is not believed to be known.

The photochromic material 14 is carried, directly or indirectly, by the container 12. For example, the container composition itself could include the photochromic material 14. In another example, a portion of the container 12 may be coated with a photochromic coating. In a further example, the container 12 may carry a separate photochromic component that may be non-removably attached to the container 12 via glass welding, epoxy, ceramic adhesive, or the like. Such a separate photochromic component may include, for example, a borosilicate photochromic piece of glass that is thermally treated at a temperature below its softening point to cure the glass.

In any case, the photochromic material 14 provides a counterfeit deterrence feature that provides evidence that the original package 10 has been transferred from one owner to another, or has been used. More specifically, the photochromic material 14 may indicate design-intent use of the package 10, like dispensing or removal of the product contained. The photochromic material 14 may be changed by exposure to ultraviolet (UV) light and, more specifically, may be changed irreversibly according to design intent or ordinary use of the package 10, and not according to misuse or extraordinary conditions, for example, attempts to tamper with the package 10 for counterfeiting, or the like. The UV light used to irreversibly change the photochromic material 14 preferably includes UVA and all ranges and subranges thereof, Near UV and all ranges and subranges thereof, or, more particularly, UV light greater than about 360 nm. The irreversible change may include darkening, or latent darkening, of the photochromic material.

The ID code 16 may be unique, and human readable and/or machine readable, and may be carried by the container 12 directly, and/or indirectly via the photochromic material 14. For example, as shown in the illustrated embodiment, the code 16 may be a latent image in the photochromic material 14. In other embodiments, the code 16 may be a data matrix that is optically-readable to provide information associated with the container 12, for example, information about the container itself and/or the contents thereof. The code 16 may comprise any identifying marking that includes one or more optically-readable elements or combination of elements (e.g., dots, letters, numbers, symbols, graphics, or other indicia) arranged in a particular manner. In a specific example, the code 16 may include a dot matrix that includes a plurality of optically-readable dots arranged in a predetermined pattern (e.g., columns and rows). Portions of the code 16 may include a plurality of embossments or debossments integrally formed on the container 12, and/or laser engravings in or on the outer surface thereof. The ID code 16 may be readable by a camera-equipped smart phone or other device suitable to recognize the code 16, cross-reference it with a database of authentic codes, and report verification of authenticity to a user.

In addition to the example latent image type of ID code 16, another latent image may be applied to one or more portions of the photochromic material 14 to provide an informative visible indication to a purchaser that the package 10 is authentic. Accordingly, the photochromic material 14 may include a contrast portion that may be selectively pre-exposed to UV, selectively UV protected, or defined by a selectively applied ceramic label (ACL) process or the like. The contrast portion may include the ID code 16 and/or a decorative feature, for example, the word "AUTHENTIC", a brand-reinforcing indicia, logo, name, slogan, or the like. Accordingly, before other portions of the photochromic material 14 have darkened, the contrast portion may be darkened by pre-exposure to UV, or when other portions of the photochromic material 14 darken upon exposure to the UV light, the contrast portion may be protected against darkening to stand out in contrast.

In one example, a mask or stencil may be applied to the photochromic material 14 and, thereafter, UV light may be applied to the photochromic material 14 to create a latent image of an ID code 16 and/or a brand-reinforcing image. In this example, when the photochromic material 14 that has been pre-exposed to UV is again exposed to light, the latent image darkens to become visible. With continued exposure to light, portions of the photochromic material 14 that were not pre-exposed would also darken, obscuring the previously visible image, thereby effectively causing the ID code 16 and/or brand-reinforcing image to disappear.

In another example, a UV protective coating or protector may be selectively applied to the photochromic material 14 to protect portions of the photochromic material 14 to either provide a brand-reinforcing image or to provide cautionary indicia. More particularly, the photochromic material 14 may have a contrast portion that does not darken upon darkening of other portions of the photochromic material 14. For example, the contrast portion may include cautionary indicia, for instance, "WARNING: Package Has Been Tampered With", "WARNING: Package Has Been Previously Authenticated", or any other suitable text, symbol, or the like. In this example, when the photochromic material 14 is exposed to UV light, the brand-reinforcing image or cautionary indicia would not disappear.

Selective application of contrast material may include use of masks, stencils, screens, spray nozzles, spray heads, or the like. The UV pre-exposed or UV protected portion of the contrast portion may be adjacent to (for example surrounded by, or vice-versa) an unexposed or uncovered portion to provide contrast. In other embodiments, the cautionary or other indicia may be established by the shape or outline of the photochromic material 14. In other words, the photochromic material 14 may be shaped as any suitable text, symbol, or the like, such that masking and the like is not required.

With reference to FIG. 1A, the package 10 also may include a lighting circuit 40. In the illustrated embodiment, the lighting circuit 40 may include a power source 42, at least one ultraviolet (UV) light source 44, and a package opening indicator 46 switchably coupled between the power source 42 and the light source 44. The power source 42 may include one or more batteries, quartz piezoelectrics, capacitors, solar cells, or any other suitable supply of electricity. The UV light source 44 may include one or more UV light emitting diodes (LEDs), or any other suitable source(s) of UV light. In one embodiment, one light source may emit light between 360 and 390 nm wavelength and all subranges therebetween and, more particularly between 365 and 385 nm wavelength and all subranges therebetween, or any other suitable wavelength.

The light source 44 and any other portion(s) of the lighting circuit 40 may be separately coupled to the container 12 in a non-removable manner. For example, the light source 44 may be located in a push up or punt of the container and secured thereto with an epoxy, ceramic adhesive, potting compound, or the like. The package opening indicator 46 may include circuitry that may be carried by the container 12 between the light source 44 and the closure 11 so as to activate the light source 44 when the closure 11 is removed from the container 12. Any suitable circuitry may be used including a capacitive proximity sensor, magnetic sensor (e.g. reed switch), photoelectric sensor, inductive proximity sensor, or any other suitable sensor or switch and related wiring, tracings, power supply, and/or the like.

Accordingly, the UV light from the optional UV light source 44 may be used to expose the portion of the photochromic material 14 to reveal the ID code 16. In other embodiments, the light source 44 may be manually activated by a manual switch between the power source 42 and the light source 44, motion activated by a motion sensor/switch between the power source 42 and the light source 44, proximity activated by a proximity sensor/switch between the power source 42 and the light source 44, or dispense activated by a liquid sensor/switch between the power source 42 and the light source 44 and located, for example, at the open mouth of the container 12.

In another embodiment, one or more other ID codes 15a, 15b may be applied to the container 12 and may correspond in some predetermined manner to the ID code 16. For example, the container 12 may include a user-readable ID code 15a, for example, an alphanumeric code. In another example, the container 12 may include a machine-readable ID code 15b, for example, a bar code, QR code, or the like. The other code(s) 15a, 15b may be unique, and may be permanently or non-removably carried by the container 12, for example, via laser engraving, embossing, or in any other suitable manner. The codes 15a,b, 16 may be cross-referenced. For example, the codes 15a,b, 16 may correspond to each other by being identical. In another example, the codes 15a,b, 16 may be matchable via a decoding algorithm, or in any other suitable manner that relates the codes 15a,b, 16. For instance, the codes 15a,b, 16 may be cross-referenced against a database of authentic codes to verify that the codes belong together on the same package. More specifically, a user may navigate to a website of a container manufacturer, packager, distributor, or the like, wherein the website may have functionality to prompt the user to enter one or both of the codes, and execute a look up function in a database, spreadsheet, or the like, or execute the decoding algorithm. In response, the website also may have the functionality to return the other of the two codes that should be present on the container, or to return an indication of authenticity if the user entered two valid codes or an indication of counterfeit if the user entered an invalid code combination, or the like.

With respect to FIG. 1, a code analyzer 50 may be used to read the ID code(s) 16 from a package 10, process the code(s) 16 in conjunction with stored data, verify authenticity or origination of the package 10 and/or obtain information about the package 10 or information about the product associated with the codes(s) 16. The code analyzer 50 can include any suitable apparatus that may include an image capturing device, a controller, power supply, communications hardware, and other suitable hardware and software. For example, the code analyzer 50 may include any suitable apparatus having a camera, processor, memory, battery, wired and/or wireless communications hardware, code recognition application, and the like. The code analyzer 50 may be communication with a computer network, for example, a company intranet, the Internet, or any other suitable computer network. Accordingly, the code analyzer 50 may include an industrial imaging and computing apparatus, a smart phone with a camera, or any other suitable computing device adapted for the special purpose of reading ID codes.

In use, a package manufacturer can use the code analyzer 50 to analyze the code(s) 16 on a package 10 and store information about the package 10 in conjunction with the analyzed pattern as a record in a database, for instance, a production database or the like, for later retrieval. More specifically, the package manufacturer may use the code analyzer 50 to activate the code recognition application, aim the camera at the code(s) 16, frame the code(s) 16 using any suitable cross-hairs, frame overlay, or the like of the camera and/or code recognition application, and acquire a corresponding image. The application may recognize the code(s) 16 by cross-referencing the acquired image against records in the database in any suitable manner, and data can be added to the database in association with the package 10. Likewise, a beverage manufacturer can use the code analyzer 50 to capture the code(s) 16 for a given package 10, upload the captured code(s) 16 to the database for cross-referencing therewith, download information about the package 10, and upload information about a product with which the package 10 is filled to the database. Similarly, a distributor, retailer, consumer, or the like can use the code analyzer 50 to capture the code(s) 16 for a given package 10, upload the captured code(s) 16 to the database for cross-referencing therewith, and download information about the package 10 and/or the product contained therein. Accordingly, the package manufacturer, beverage manufacturer, distributor, retailer, consumer, or the like can obtain information about the package 10 and/or the product contained therein.

Accordingly, the code(s) 16 can be used throughout a distribution and supply chain for package 10 or product tracking and tracing, and/or authenticity verification of the package 10 and/or the product contained within the package 10. For example, a variety of attributes can be verified or added during the product cycle, for instance, the date and/or location of manufacture of the package 10 and/or the product contained within the package 10, authenticity of the package 10 and/or the product therein, and the like. In another example, an end consumer's use could trigger an "original/authentic product used" feature for the code(s) 16 associated with the package 10 so that any subsequent uses would reveal a non-authentic or counterfeit product. For instance, when a package 10 bearing a code(s) 16 is purchased, a retailer may use a point of sale (POS) system including the code analyzer 50 to scan or otherwise read the code(s) 16 and cross-reference and update the database (or other database) to indicate that the particular package 10 has been sold to a customer. Thereafter, if the package 10 is ever repackaged and resold, the point of sale system can be used to indicate that the package 10 has already been sold. For example, the POS system can read the code(s) 16 of the repackaged package 10 and cross-reference the database, at which point, the POS system will discover that the database has already been updated with the previous sale and the POS system can issue an alert, prevent the sale, or the like, in any suitable manner. In effect, the code(s) 16 can be used to provide a chain of custody for the package 10 to thwart unauthorized reuse or counterfeiting thereof.

With reference to FIG. 2, the UV protector 18 may include a UV protective cover or appliqué applied to an exterior surface of the container 12 and having at least a portion that is removable from the container 12. The UV protector 18 has multiple portions, which may include the main portion 18*a* that covers the ID code 16 and that is liftable and replaceable, and the one or more irreplaceable portions 18*b*-*e*. The UV protector 18 also may include preweakenings 19 between the various portions 18*a*-*e* and/or between the portions 18*a*-*e* and a common portion (not shown) of the protector 18. The preweakenings 19 may include perforations, thinnings, scorings, or any other suitable preweakenings. The protector 18 may include a product label, and may be opaque, or translucent including a UV protective material. In any case, one or more portions of the protector 18 are irreplaceable. As used herein, the term "irreplaceable" includes being not returnable to an original state.

Figure 7:
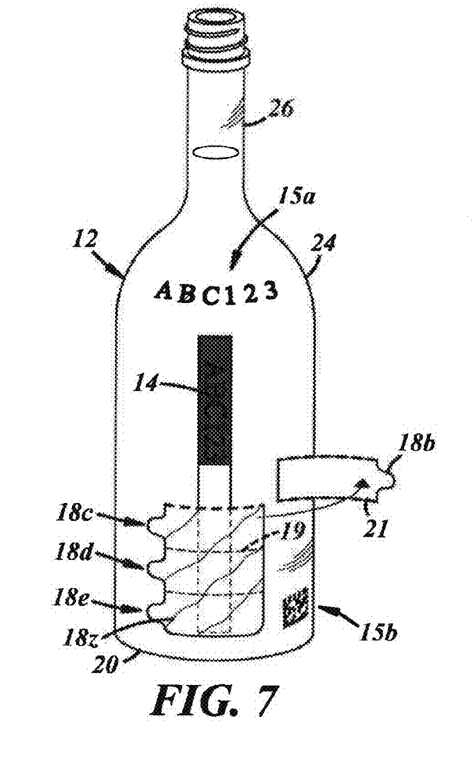
FIG. 7 is a perspective view of the package of FIG. 1, illustrating a second portion of the protector removed from the container.

For example, and with reference to FIG. 7, a portion of the protector 18 may be removed from the container 12 by tearing along one or more of the preweakenings 19 of the protector 18, such that the torn, removed portion exhibits at least one torn jagged edge 21 and, thus, is not returnable to an untorn original state thereby providing visual evidence of use or tampering.

In another example, an outer surface of the protector 18 may include a continuous pattern 18*z* that traverses the preweakenings of the various portions of the protector 18. Although the pattern 18*z* illustrated in the drawing figures is merely schematic, the pattern 18*z* may include an intricate design, a photograph, text, or any other visual display that, once a portion of the protector 18 is torn away from the rest of the protector 18, provides visual evidence of use or tampering.

In a further example, the protector 18 may be composed of a deformable or stretchable material. Accordingly, once a portion of such material is pulled and torn away from the rest of the protector 18, corresponding portions of the protector 18 become so distorted that it is not possible to replace the removed portion without a user noticing that the integrity of the protector 18 has been compromised, thereby providing visual evidence of use or tampering. For example, the protector 18 may be composed of a polymeric film, a metal foil, or the like. In another example, the protector 18 may be composed of a film or foil having multiple layers adhered to one another, wherein once an outer layer of the film or foil is removed from an inner layer of the film, the two layers will not re-adhere to one another.

In an additional example, any of the foregoing examples may be used in combination with one another.

With reference to FIG. 2, a first purchaser may verify whether or not the container, package, and/or product is authentic. For example, the user can access an application loaded on a camera-equipped smart phone to facilitate taking a photograph of the code 15*b*, accessing a database, and informing the user to remove the first portion 18*a* of the protector 18 and look for the valid code (e.g. ABC123) to verify authenticity.

With reference to FIG. 3, the purchaser removes the first portion 18*a* to verify authenticity of the package 10. More specifically, a user may remove a portion of the protector 18 to reveal the photochromic material 14 and, upon removal, a latent image of the ID 16 is not immediately visible because the photochromic material has been shielded from light.

In this embodiment, the latent image of the ID 16 is a portion of the photochromic material 14 that was pre-exposed to UV light, for example, during manufacturing, using a stencil, mask, or any other suitable selective exposure expedient, while the rest or background of the photochromic material 14 is covered or unexposed. This causes an image of the ID 16 to become set in the photochromic material 14. Sometime after the photochromic material 14 is covered with the protector 18, the image of ID 16 fades, until exposed to light again when protector 18 is removed.

With reference to FIG. 4, the latent image of the ID 16 becomes visible via darkening because the photochromic material has been exposed to visible light. At this time, the purchaser may see that the latent image of the ID 16 is the valid code (e.g. AB C123) thereby verifying authenticity, or may see an invalid code (e.g. DEF987) thereby refuting authenticity.

Further, with reference FIG. 5, the rest of the exposed photochromic material 14 also starts to darken with exposure to light.

Figure 6:
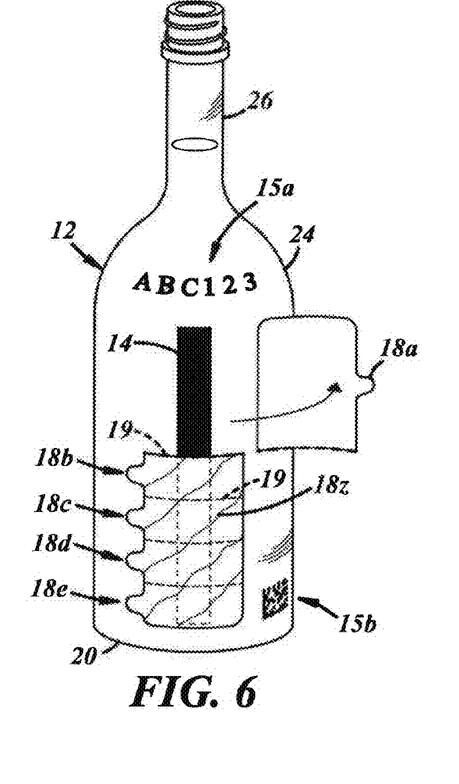
FIG. 6 is a perspective view of the package of FIG. 1, illustrating completed darkening of the first portion of the photochromic material.

Moreover, with reference to FIG. 6, eventually, the entirety of the exposed photochromic material 14 darkens with continued exposure to light. But if the photochromic material 14 is shielded from light, for example, by reapplication of the protector 18 or a corresponding portion thereof, the darkening of the photochromic material 14 may fade. Accordingly, a corresponding latent image in the material 14 may fade. But if the photochromic material 14 is thereafter again exposed to light, then the material 14 will once again darken. Depending on the magnitude, duration, and/or wavelength, of the exposure to UV light, different portions of the material 14 may darken at different rates.

Accordingly, the photochromic material 14 may be irreversibly activated by exposure to UV light. In contrast, the activated material 14 may be reversibly developed by exposure to visible light, such that the development is reversible upon concealment of the material 14.

With reference to FIG. 7, subsequent purchasers/users can remove additional irreplaceable portions 18*b-d* to verify authenticity of the package 10 in a manner similar to that described above. Ultimately, a final purchaser/consumer of the package 10 may remove the entire protector or a remainder portion 18*e* thereof to expose the entirety of the photochromic material 14 to indicate ultimate use of the package 10 and deter efforts to reuse the package 10 with counterfeit contents.

Also, or instead, when the final purchaser/consumer consumes the UV blocking beverage so that the level of the beverage lowers, the photochromic material 14 (or previously UV-unexposed portions thereof) becomes exposed to indicate ultimate depletion or use of the package 10 and deter efforts to reuse the package 10 with counterfeit contents. Such reuse is deterred because a subsequent purchaser would see that the package 10 has already been used via the totally exposed photochromic material 14, even though the package 10 is full of a beverage. In this embodiment, the photochromic material 14 may be protected by a UV protective coating, except for a rear or radially inner side that is UV protected by the beverage until the level thereof decreases to allow exposure of the material 14.

Figures 8, 9, 10:
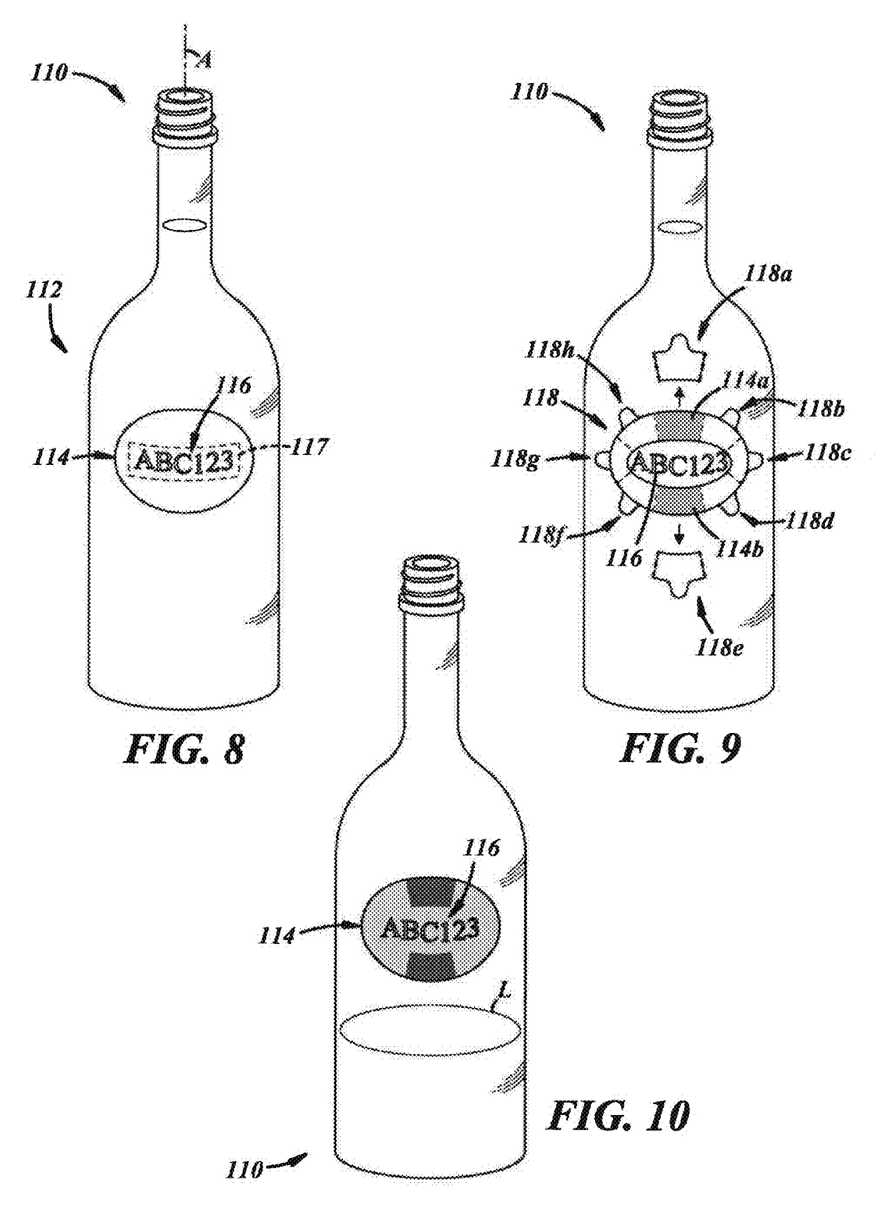
FIG. 8 is a perspective view of a package in accordance with another illustrative embodiment of the present disclosure and illustrating a container, a photochromic material carried by the container, and an identification code carried by the photochromic material.
FIG. 9 is a perspective view of the package of FIG. 9, illustrating an ultraviolet light protector carried by the container over the photochromic material.
FIG. 10 is a perspective view of the package of FIG. 9, including a low level of liquid therein, and illustrating portions of the protector moved or removed from the container and illustrating the entire photochromic material in a changed state by virtue of the low liquid level.

FIGS. 8-10 show another illustrative embodiment of a package 110. This embodiment is similar in many respects to the embodiment of FIGS. 1-7 and like numerals among the embodiments generally designate like or corresponding elements throughout the several views of the drawing figures. Accordingly, the descriptions of the embodiments are incorporated into one another, and description of subject matter common to the embodiments generally may not be repeated here.

FIG. 8 illustrates a package 110 including the glass container 112, a photochromic material 114 that is carried by the container 112 and that changes appearance upon exposure to ultraviolet (UV) light, and an identification (ID) code 116 that is permanently or non-removably carried by the container 112, and in this embodiment, is carried by the photochromic material 114. The ID code 116 may include a permanent marking via laser engraving in a portion of the photochromic material 114. The package 110 also includes a UV protective coating 117 applied over a portion of the photochromic material 114 that is coded with the ID code 116.

With reference to FIG. 9, the package 110 also includes a UV protector 118 carried over the photochromic material 114 to protect the photochromic material 114 from premature exposure to the UV light. The protector 118 includes multiple portions 118*a-h* that are removable to expose corresponding multiple portions of the photochromic material 114 to UV light and are irreplaceable once removed to facilitate multiple instances of authentication of the package 110. In this embodiment, the UV protector 118 includes an annular array of irreplaceable portions circumscribing the ID code 116. Also in this embodiment, the UV protector 118, or at least a portion thereof, is located closer to the shoulder of the container than to the base of the container, so as to deter even partial refilling of the container with counterfeit product.

FIG. 9 illustrates portions 118*a* and 118*e* of the protector 118 removed such that corresponding portions 114*a* and 114*b* of the photochromic material 11 have been irreversibly changed in appearance.

FIG. 10 illustrates the entirety of the photochromic material 114 irreversibly changed in appearance. Even the UV protected code 116 is irreversibly changed in appearance because the corresponding portion of the photochromic material 114 has been exposed to UV light through the rear thereof because of a low level L of UV protective beverage in the container 112.

There thus has been disclosed a package capable of multi-instance photosensitive authentication that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A package for multi-instance photosensitive authentication, comprising:
   a container;
   a photochromic material non-removably carried by the container and irreversibly changeable upon exposure to ultraviolet (UV) light; and
   a UV protector carried over the photochromic material to protect the photochromic material from premature exposure to the UV light, and having multiple portions that are removable to expose multiple portions of the photochromic material to UV light and are irreplaceable once removed,
   wherein multi-instance photosensitive authentication of the package is facilitated.

2. The package set forth in claim 1, wherein the multiple portions of the UV protector include preweakenings to facilitate tearing of the multiple portions.

3. The package set forth in claim 1, wherein the package further comprises a UV blocking beverage carried inside the container, such that removal of the beverage exposes at least one of the multiple portions of the photochromic material to UV light.

4. The package set forth in claim 1, further comprising a latent image indicative of authenticity carried by the photochromic material to provide a visible indication to a purchaser that the package is authentic.

5. The package set forth in claim 1, further comprising an identification (ID) code non-removably carried by the container.

6. The package set forth in claim 5, wherein the ID code includes a latent image carried by the photochromic material, wherein the UV protector includes a main portion that covers the ID code and that is liftable away from the container and replaceable thereto.

7. The package set forth in claim 5, wherein the ID code includes a permanent marking via laser engraving in a portion of the photochromic material, and a UV protective coating is applied over a portion of the photochromic material coded with the ID code.

8. The package set forth in claim 5, wherein the ID code is machine readable by a code analyzer having a code reader.

9. A method of authenticating the package set forth in claim 8, wherein the code analyzer recognizes the code, and reports verification of authenticity to a user in response to a cross-reference of the code with a database of authentic codes.

10. The package set forth in claim 5, further comprising a second ID code that is carried by the container and that corresponds to the ID code.

11. A method of authenticating the package set forth in claim 10, wherein the codes are readable by a code analyzer having a code reader, and wherein the code analyzer recognizes the codes, and reports verification of authenticity to a user in response to a cross-reference of the codes with a database to establish that the codes belong together on the same package.

12. The package set forth in claim 5, further comprising:
a UV light source carried by the container;
a power source carried by the container to power the UV light source; and
an activator carried by the container to activate the UV light source to expose the photochromic material.

13. A method of authenticating the package set forth in claim 5, comprising receiving the ID code from a user, cross-referencing the ID code with a database of authentic codes, and transmitting an indication of authenticity to the user.

14. The method set forth in claim 13, further comprising removing a portion of the UV protector to expose a corresponding portion of the photochromic material.

15. A package produced by the method set forth in claim 14.

16. A package for multi-instance photosensitive authentication, comprising:
a glass container;
a photochromic material non-removably carried by the glass container and irreversibly activated upon exposure to ultraviolet (UV) light;
a UV protector carried over the photochromic material to protect the photochromic material from premature exposure to the UV light, and having multiple portions that are removable to expose multiple portions of the photochromic material to UV light and irreplaceable once removed, wherein the multiple portions of the UV protector include preweakenings to facilitate tearing of the multiple portions; and
a UV blocking beverage carried inside the container, such that removal of the beverage exposes at least one of the multiple portions of the photochromic material to UV light,
wherein multi-instance photosensitive authentication of the package is facilitated.

17. The package set forth in claim 16, further comprising a latent image indicative of authenticity carried by the photochromic material to provide a visible indication to a purchaser that the package is authentic.

18. The package set forth in claim 16, further comprising an identification (ID) code non-removably carried by the glass container.

19. The package set forth in claim 18, wherein the ID code includes a latent image carried by the photochromic material, wherein the UV protector includes a main portion that covers the ID code and that is liftable away from the container and replaceable thereto.

20. The package set forth in claim 18, wherein the ID code includes a permanent marking via laser engraving in a portion of the photochromic material, and a UV protective coating is applied over a portion of the photochromic material coded with the ID code.

21. The package set forth in claim 18, further comprising a second ID code that is carried by the container and that corresponds to the ID code.

22. The package set forth in claim 18, further comprising:
a UV light source carried by the container;
a power source carried by the container to power the UV light source; and
an activator carried by the container to activate the UV light source to expose the photochromic material.

23. A package for multi-instance photosensitive authentication, comprising:
a container;
a photochromic material non-removably carried by the container and irreversibly changeable upon exposure to ultraviolet (UV) light; and
a UV protector carried over the photochromic material to protect the photochromic material from premature exposure to the UV light, and having multiple portions that are removable to expose multiple portions of the photochromic material to UV light; and
at least one of:
an identification (ID) code non-removably carried by the container, or
a latent image indicative of authenticity carried by the photochromic material to provide a visible indication to a purchaser that the package is authentic.

* * * * *